United States Patent [19]

Reuschel et al.

[11] Patent Number: 4,937,767
[45] Date of Patent: Jun. 26, 1990

[54] METHOD AND APPARATUS FOR ADJUSTING THE INTENSITY PROFILE OF AN ULTRASOUND BEAM

[75] Inventors: Jorg Reuschel, Sindelfingen; Arno Rudolph, Weil der Stadt, both of Fed. Rep. of Germany

[73] Assignee: Hewlett-Packard Company, Palo Alto, Calif.

[21] Appl. No.: 138,758

[22] Filed: Dec. 24, 1987

[30] Foreign Application Priority Data

Dec. 24, 1986 [DE] Fed. Rep. of Germany ... 86118068.5

[51] Int. Cl.$^5$ ................ H04B 11/00; G01N 29/00
[52] U.S. Cl. ................ 364/570; 73/609; 73/646; 367/103; 367/105; 367/138; 367/155
[58] Field of Search ................ 364/570, 413.25; 367/138, 103, 105, 905, 12, 155, 119; 73/596, 609, 646

[56] References Cited

U.S. PATENT DOCUMENTS

| | | | |
|---|---|---|---|
| 3,919,683 | 11/1975 | Itamura et al. | 367/105 |
| 4,075,598 | 2/1978 | Takamizawa et al. | 367/105 |
| 4,161,121 | 7/1979 | Zitelli et al. | 367/105 |
| 4,234,940 | 11/1980 | Iinuma | 367/105 |
| 4,290,310 | 9/1981 | Anderson | 367/105 |
| 4,353,123 | 10/1982 | Rost et al. | 367/138 |
| 4,455,630 | 6/1984 | Loonen | 367/103 |

FOREIGN PATENT DOCUMENTS 8000497 3/1980 World Int. Prop. O. .

Primary Examiner—Kevin J. Teska
Attorney, Agent, or Firm—Frank R. Perillo

[57] ABSTRACT

The intensity profile of an ultrasound beam in an ultrasound imaging system is adjusted by driving the individual piezoelectric crystals with drive signals having adjustable pulse durations. The duration of the drive pulse determines the frequency spectrum of the pulse and therefore determines the amplitude of the emitted ultrasound wave. The pulse durations may be selected such as to compose a desired profile of the ultrasound beam.

11 Claims, 5 Drawing Sheets

METHOD AND APPARATUS FOR ADJUSTING THE INTENSITY PROFILE OF AN ULTRASOUND BEAM

BACKGROUND AND SUMMARY OF THE INVENTION

This invention relates to a method and apparatus for adjusting the intensity profile of an ultrasound beam used in an ultrasound imaging system.

In a conventional ultrasound imaging system an ultrasound beam is generated by multiple piezoelectric crystals which simultaneously radiate ultrasound signals into an object to be imaged. The beam may include side lobes which can cause degradiation of the ultrasound image of the object.

Prior art ultrasound imaging systems have used a technique called apodization to decrease the effect of the beam side lobes and thereby to increase image resolution. In this technique, the ultrasound signals generated by the boundary piezoelectric crystals are attenuated relative to the signals generated by the center crystals. This technique may be implemented by attenuating the drive signals applied to the boundary crystals relative to the drive signals applied to the center crystals. Prior art systems have used individual attenuators for each crystal to produce a desired ultrasound beam profile. Unfortunately, in order to modify the profile, individual attenuators must be replaced in a procedure that is often tedious and time-consuming.

In accordance with the illustrated preferred embodiment of the present invention, an ultrasound imaging system has a beam intensity profile that is simple to modify. One benefit of this flexibility is that the profile may be adjusted as necessary to obtain an improved resolution of the ultrasound image. Instead of adjusting drive signal amplitudes, as is done in the prior art, the system adjusts the duration of the drive pulses. Since each pielectric crystal generates a maximum amplitude signal at its resonant frequency, the signal amplitude may be varied by varying the drive frequency around the crystal resonant frequency. The drive frequency may easily be varied by varying the duration of the drive pulses since the drive frequency is related to the drive pulse duration as may be demonstrated by Fourier analysis.

For example, a train of short drive pulses has a spectrum containing more high frequency components than does a train of longer drive pulses. Since these high frequency components are strongly attenuated by a piezoelectric crystal, the resulting ultrasound signal has a lower amplitude than if the longer drive pulses were used. By adjusting the durations of the drive pulses applied to individual piezoelectric crystals, the intensity profile of the ultrasound beam can be shaped as desired. A desired shaping may involve decreasing side lobe amplitudes in order to maximize images resolution.

An apparatus constructed in accordance with the preferred embodiment includes a drive pulse adjuster for adjusting the durations of the drive pulses. This adjuster may be driven by a single voltage source so that circuit costs may be kept low. The ultrasound system may be a scanner in which successive groups of piezoelectric crystals are activated so that an object may be scanned. In addition, the intensity profile may be controlled by a computer for easy modification. Computer control may be particularly advantageous in compensating for performance variations between individual piezoelectric crystals due to manufacturing tolerances. In addition, computer control allows beam shaping which may be used to vary the depth range of the beam.

DETAILED DESCRIPTION OF THE PREFERRED EMBODIMENT

Figure 1:
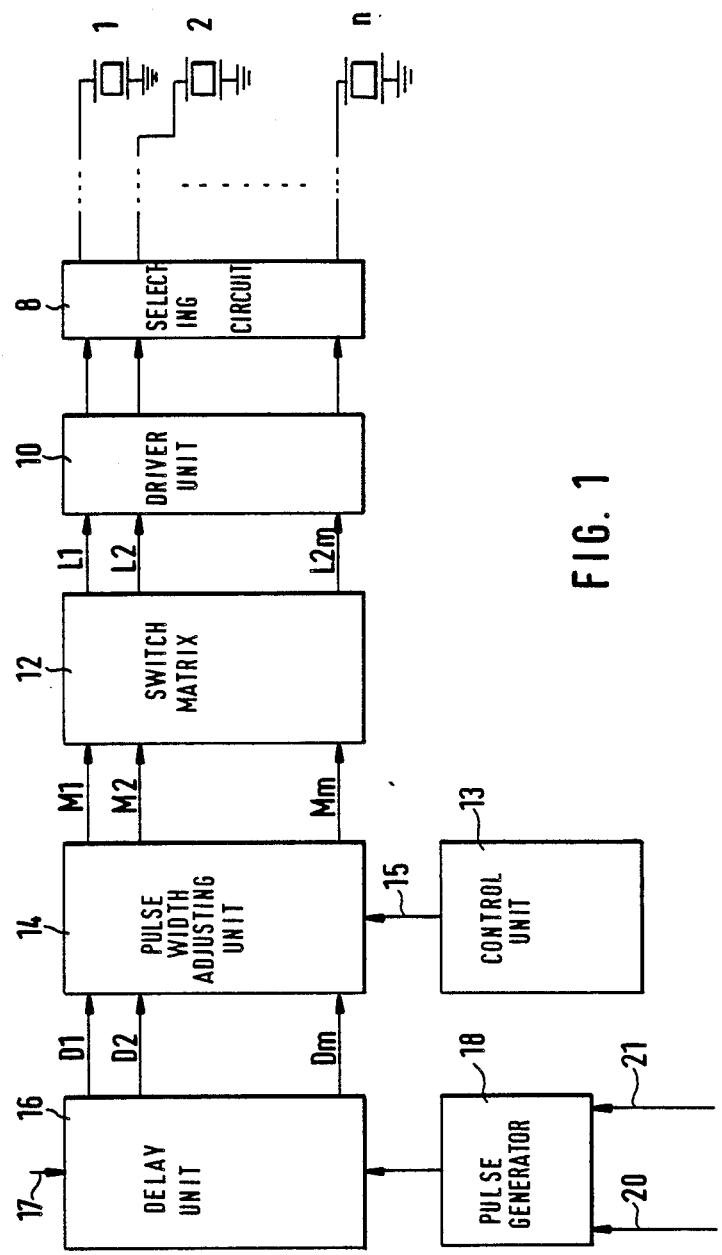
FIG. 1 shows the transmit channel of an ultrasound system that is constructed in accordance with the preferred embodiment of the present invention.

FIG. 1 shows an ultrasound imaging system which includes an array of n piezoelectric crystals 1, 2, ..., n which can be placed on the body of a patient for examination. The piezoelectric crystals 1−n can be activated in groups of neighboring crystals each time during a transmit/receive period. In successive transmit/receive periods different groups are activated in order to scan the object under examination. For example, in a first period the crystals 1-4 may be activated, in the next period crystals 2-5 may be activated, etc., until all crystals of the array have been activated. The scanning procedure may then begin again with the activation of crystals 1-4.

Circuitry for activating the piezoelectric crystals includes a pulse generator 18 which receives clock pulese on a line 21. Generator 18 delivers transmit pulses at its output in response to a trigger signal on a line 20. The pulse generator 18 is triggered at the beginning of each of a plurality of successive transmit periods.

The output pulses of the pulse generator 18 are supplied to a delay unit 16 for delaying the pulses and for producing m output signals on m output lines D1, D2, . . . Dm. The m output signals are delayed relative to each other in such a way as to achieve a focusing of the ultrasound beam emitted by a group of the piezoelectric crystals 1−n. For this purpose the signals for activating the bouondary crystals of the group of activated piezoelectric crystals are delayed by a smaller time interval than the signals for activatting the crystals that are closer to the center of the group. All of the ultrasound waves originating from an activated group amplify at a common focusing point.

Due to the symmetry of the required delays for the piezoelectric crystals in a group with respect to the center crystal of the group, the number of different delays is only half the number of crystals in the group. For example, if crystals 1-are activated, the drive signals for crystals 2 and 3 are delayed relative to the drive signals for crystals 1 and 4. The amount of delay is determined according to the difference in the propagation time of ultrasound waves from elements 1 and 4 and from crystals 2 and 3 to the common focusing point. The delay times can be adjusted via line 17.

The m output lines D1, D2, ..., Dm of the delay unit 16 are connected to a pulse width adjusting unit 14 which adjusts the duration of the drive pulses according to the desired beam profile. Information about the desired beam shape may be supplied digitally from a control unit 13 on line 15 by specifying the widths of the drive pulses for individual crystals necessary for composition of the beam profile. Drive signal frequency spectra is related to drive pulse width with the result that individual piezoelectric crystals may be driven with different frequencies so that different amplitude of the ultrasound signals may be emitted by the piezoelectric crystals.

The m output lines M1–Mm of the pulse width adjusting unit 14 are connected to a switch matrix 12 of the type described in European patent application No. 85112072.5 entitled "Schalmatrix". Switch matrix 12 establishes appropriate connections between the m input lines M1, M2, . . . , Mm and the 2 m output lines L1–L2m in order to achieve the desired focusing. New connections have to be made each time a new group of piezoelectric crystals has been activated. The 2 m output signals of the switch matrix 12 are connected to a driver unit 10 comprising 2 m transmit drivers. The outputs of the transmit drivers are connected via a selecting circuit 8 to the array of piezoelectric crystals 1–n. The selecting circuit 8 comprises 2 m inputs, n switching elements and n outputs. Each selecting circuit 8 output is connected to one of the piezoelectric crystals 1–n.

Figure 2:
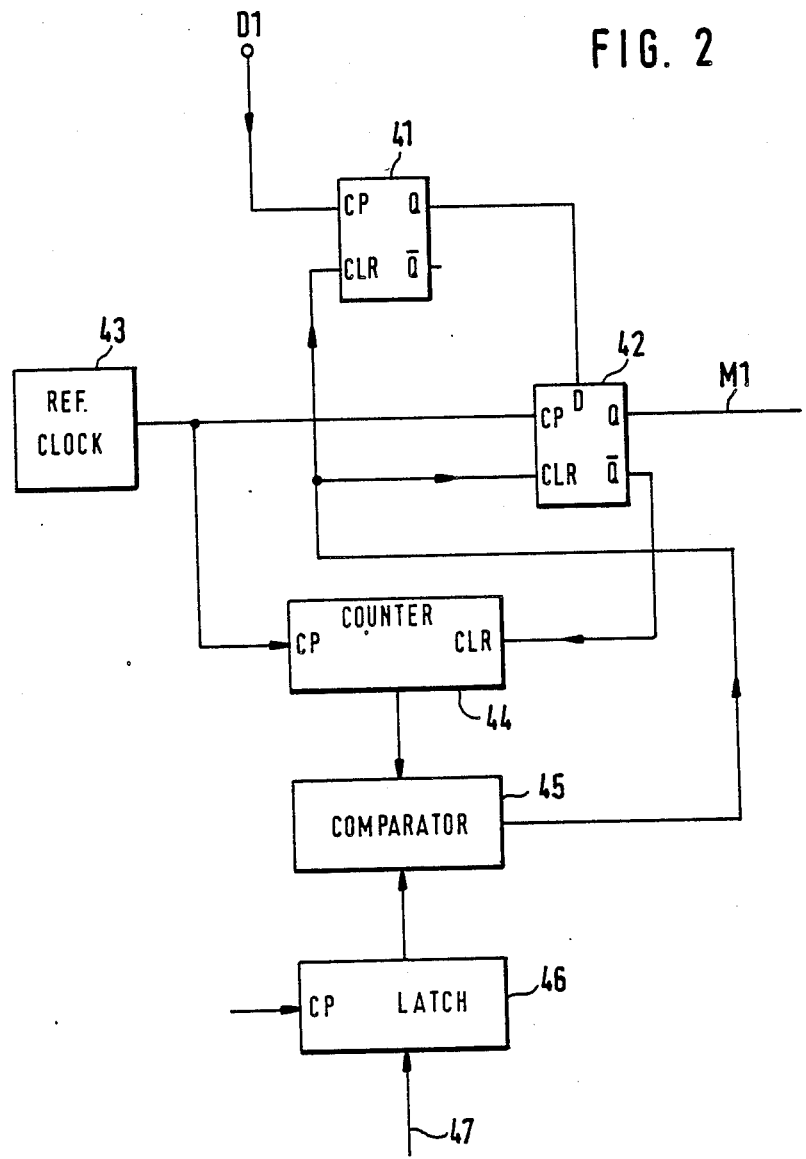
FIG. 2 shows one channel of the pulse width adjusting unit of FIG. 1.

FIG. 2 shows one implementation of a part of the pulse width adjusting unit 14. The circuit shown in FIG. 2 adjusts the width of one of the m input signal on lines D1–Dm. The complete unit 14 would consist of m of the circuits shown in FIG. 2. The input line D1 from delay unit 16 is connected to the clock input (CP) of a flipflop 41. The Q output of flipflop 41 is connected to the D input of a second flipflop 42. The Q output of flipflop 42 is connected to line M1 which forms one of the m output lines of the pulse width adjusting unit 14. The clear inputs (CLR) of the flipflops 41 and 42 are connected to the output of a comparator 45 which compares the count of a binary counter 44 with a preselected number stored in a data latch 46. The data latch 46 receives the number to be stored via line 47 from the control unit 13 (FIG. 1) which may comprise a microprocessor.

A reference clock 43 delivers clock pulses to the clock inputs (CP) of the flipflop 42 and the counter 44. The reference clock 43 may also be used to supply the required clock pulses to the remaining circuits of the pulse width adjusting unit 14. The Q output of flipflop 42 is connected to the clear input (CLR) of counter 44.

Figure 3:
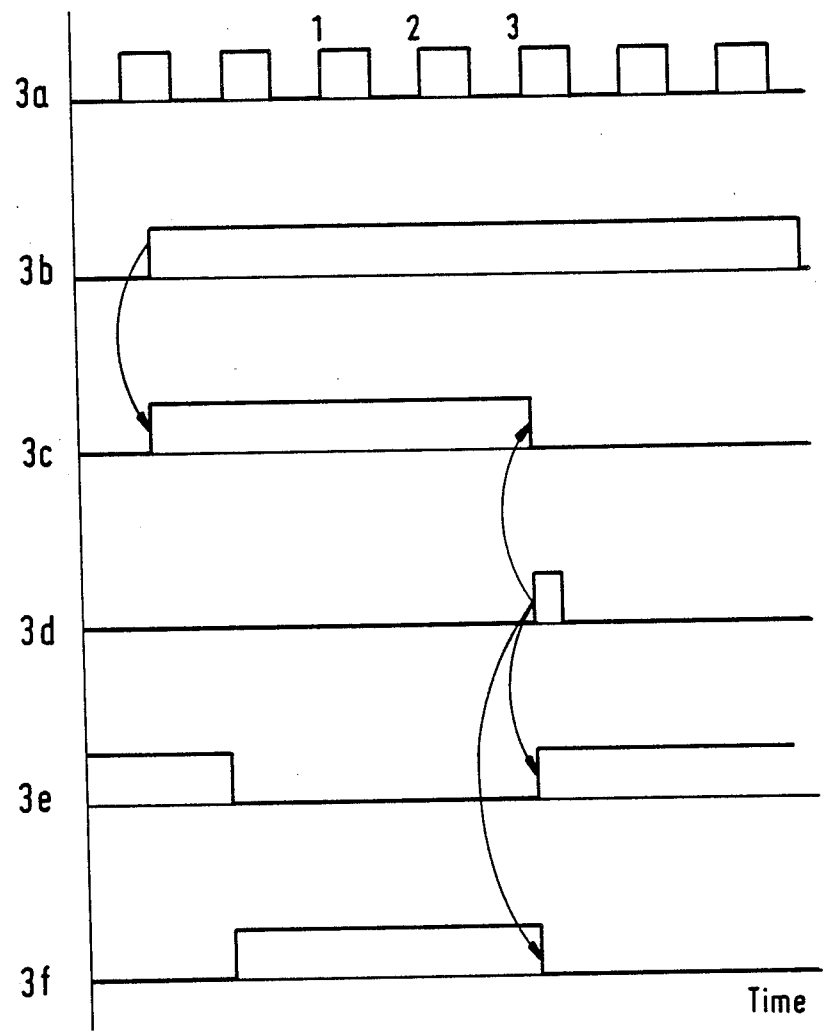
FIGS. 3a-f are timing diagrams of the circuit shown in FIG. 2.

FIG. 3 shows timing diagrams of the operation of the circuit shown in FIG. 2. Since digital circuitry is used in the embodiment of FIG. 2, only the "high" and "low" signal levels are of primary interest. An arrow in FIG. 3 indicates that a transition from low to high or from high to low of a signal causes a transition of another signal.

FIG. 3a illustrates the clock pulses of the reference clock 43 which may, for example, have a frequency of 75 MHz. FIG. 3b shows an input pulse supplied to the pulse width adjusting unit 14 on line D1. The Q output signal of flipflop 41, shown in FIG. 3c, goes high in response to the rising edge of the input pulse. The Q output signal of flipflop 42 (the output signal on line M1 of FIG. 2) goes high in response to the rising edge of the first clock pulse after the rising edge of the Q output signal of flipflop 41. Correspondingly, the Q output signal of flipflop 42 goes low. When the count of counter 44 is equal to the value in data latch 46, comparator 45 generates a short pulse, shown in FIG. 3d, which resets flipflops 41 and 42. In the example shown, the value stored in data latch 46 is three so that the comparator output signal (FIG. 3d) occurs after three clock pulses counted by counter 44. When the flipflops 41 and 42 are reset, the output signal of the pulse width adjusting unit 14 goes low, thus terminating its output signal. The duration of the output pulse on line M1 can be adjsuted by adjusting the value in data latch 46. The output signal of the comparator 45 also causes the inverted output signal of flipflop 42 to go low so that the counter 44 is reset for a new counting cycle.

Subsequently, a new input pulse transmitted via line D1 is supplied to flipflop 41 and the cycle described above starts again. The duration of the output pulse of the pulse width adjusting unit 14 depends on the data value stored in data latch 46. This data value can be changed by corresponding input data from control unit 13. Thus, the pulse duration can be varied in steps and the width of these steps is determined by the frequency of the clock pulses supplied by reference clock 43. If the clock frequency is 75 MHz, as in the present example, the duration of the output pulses can be adjusted in steps of 13.33 nanoseconds. If finer steps are desired, the clock frequency may be increased. Since the durations of the output pulses of each of the m channels of the pulse width adjusting unit 14 can be adjusted individually by storing appropriate data values in each of the data latches 46, a desired aperture function can be adjusted. The counter 44, the comparator 45 and the data latch 46 could be replaced by a preset-counter.

Figure 4:
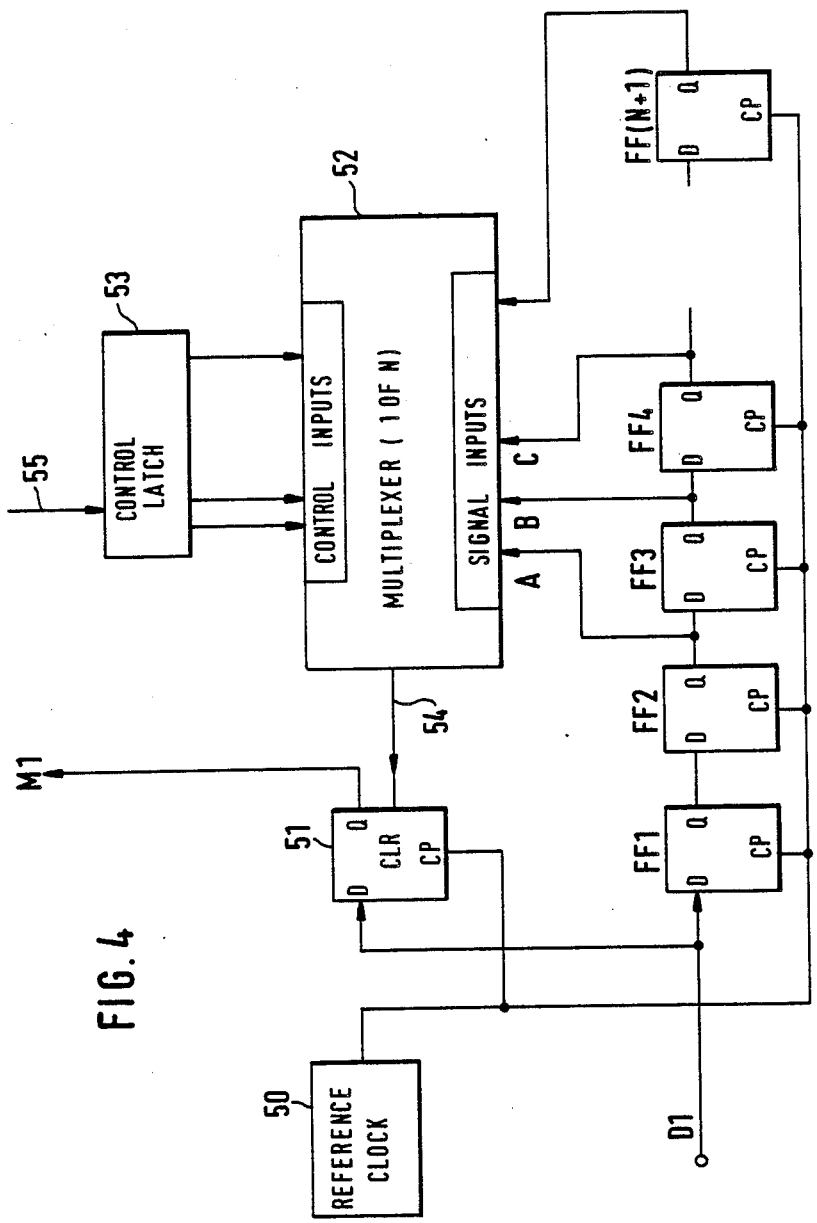
FIG. 4 shows an alternative implementation of the channel shown in FIG. 1.

FIG. 4 shows an alternative implementation of the pulse width adjusting unit 14. The input signal from delay unit 16 on line D1 is supplied to the D input of a flipflop 51 and to the D input of a flipflop FF1. The Q output of flipflop 51 is connected to line M1 whcih forms the output of the pulse width adjusting unit 14. The flipflops FF2, FF3, FF4, . . . , FF(N+1) form a digital delay line. The Q output of each flipflop of this delay line is connected to the D input of the next flipflop in the delay line. Each of the Q outputs is connected via lines A, B, C, . . . to a 1 of N multiplexer 52. The number of flipflops in this digital delay line is therefore equal to N which is preferably smaller than 2 m. The multiplexer 52 connects one of its N inputs to its output 54 in response to control data supplied to its control inputs from a control latch 53. The output 54 of the multiplexer 52 is connected to the reset input CLR of flipflop 51. The input data to the control latch is supplied from control unit 13 on line 55. The output of a reference clock 50 is connected to the clock inputs of flipflop 51 and of flipflops FF1–FF(N+1).

Figure 5:
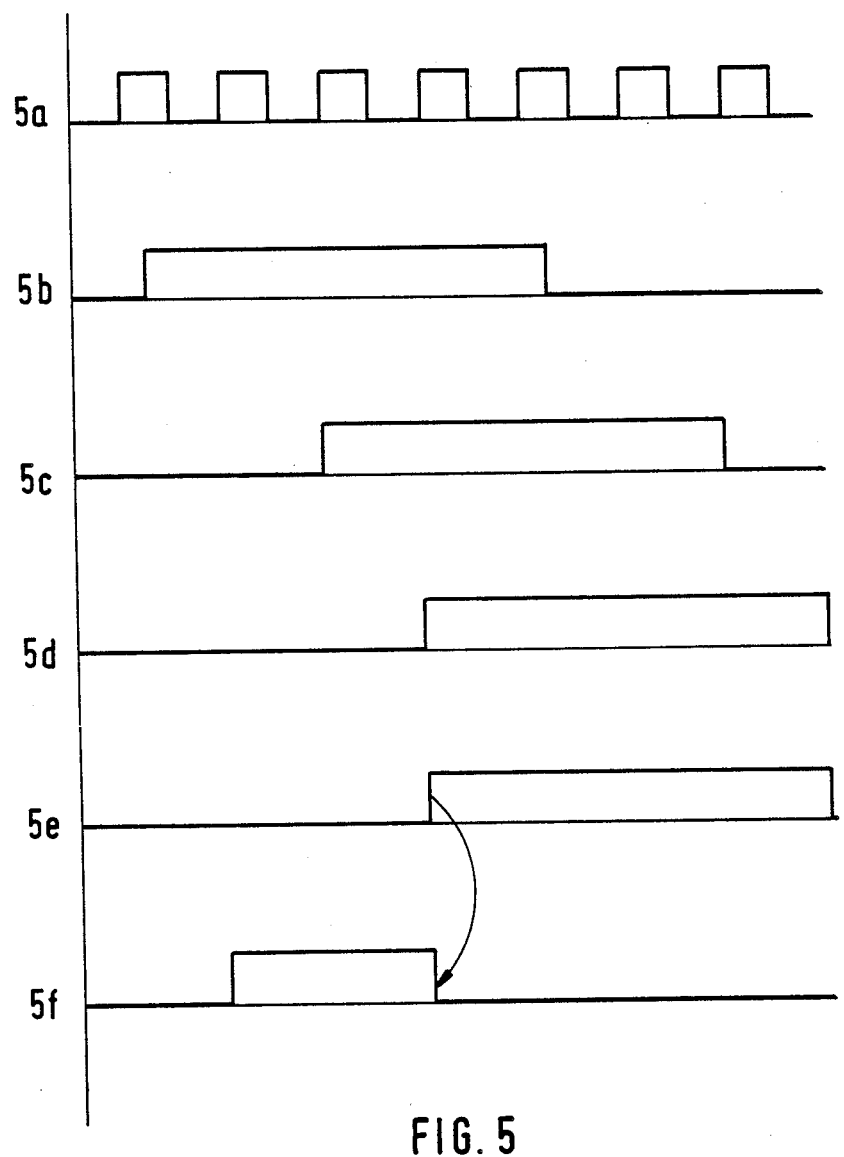
FIGS. 5a-f are timing diagrams of the circuit shown in FIG. 4.

FIG. 5 shows timing diagrams of the operation of the circuit shown in FIG. 4. FIG. 5a shows the clock pulses occurring with a frequency of, for example, 75 MHz. The input pulse on line D1 is shown in FIG. 5b. FIGS. 5c and 5d show the Q output signals of flipflops FF2 and FF3 on lines A and B, respectively. The rising edges of the signals on lines A and B are delayed relative to each other by one clock cycle. The output pulse on line M1 is shown in FIG. 5f. The rising edge of the output pulse occurs at the first clock pulse after the rising edge of the input pulse in FIG. 5b. In the present example, the signal on line B from the Q output of flipflop FF3 is connected to the output 54 of the multiplexer. With this assumption, the output signal of the multiplexer has the shape shown in FIG. 5e. The leading edge of the output signal of the multiplexer is delayed relative to the leading edge of the input pulse on line D1 according to the delay generated by the digital delay line of flipflops.

The leading edge of the output signal of the multiplexer 52 causes the flipflop 51 to be reset so that the signal at the Q output of flipflop 51 goes low and terminates the output pulse (FIG. 5f). In the example, it was assumed that the multiplexer 52 connects the input signal B to its output. If the multiplexer 52 is controlled such that a different signal, e.g., signal C, is connected to its output, the rising edge of the multiplexer 52 output signal would occur at a later point in time. Thus, the output pulse on line M1 would have a greater duration than that shown in FIG. 5f.

As discussed above, pulse width adjusting unit 14 comprises m of the circuits shown in FIGS. 2 and 4. m is the number of lines originating from the delay unit 16. Consequently, the data latch 46 (FIG. 2) or the control latch 53 (FIG. 4) have to be provided m times.

In the implementations shown in FIGS. 2 and 4, the inputs pulses of the pulse width adjusting unit 14 are shortened near the trailing edges of the pulse. This is not mandatory and the pulses could be shortened near the leading edge and near the trailing edge, or alternatively, only near the leading edge. The output pulses could even have a greater duration than the input pulses. It is only important that the pulse width adjusting unit 14 permit the adjustment of the duration of the pulses for activating the piezoelectric crystals according to the desired ultrasound beam profile. If the ultrasound beam is to be focused and the drive pulses of the piezoelectric crystals 1−n have to be delayed relative to each other (measured from pulse center to center), the adjustment of the pulse durations in the pulse width adjusting unit 14 might influence the relative delays of the impulses. This is particularly true if the input pulses of the adjusting unit 14 are shortened or prolonged only at a single edge. This potential shift in the relative delays can be compensated by appropriate adjustemnt of the delays in the delay unit.

The pulse width of the drive pulses required for generating an ultrasound wave of a specific amplitude can be determined from the transfer function of the piezoelectric crystals. The transfer function F(jw) is defined by the relationship:

$$U_A(jw) = U_t(jw) \cdot F(jw),$$

where $U_A$ represents the ultrasound wave emitted by the piezoelectric crystal, $U_t$ represents the piezoelectric crystal drive pulse having a duration t exciting the piezoelectric crystal, w represents the signal frequency, and j is the imaginary unit. The quantity $U_t$ represents the electrical excitation impulses of duration t in the frequency domain and could be derived from the time function of the drive pulse by a Fourier transformation.

The transfer function can be determined experimentally by successively driving the piezoelectric crystals 1−n with various frequencies and measuring the ultrasound amplitude for each frequency. Alternatively, the crystals 1−n could be driven with signals of different durations and the resulting ultrasound amplitudes could be measured. In both cases, the measurements can be performed for each individual piezoelectric crystal 1−n so that potential manufacturing tolerances can be compensated for. If such tolerances are negligible, it may be sufficient to measure only one crystal. The transfer function could also be calculated by known mathematical procedures from the equivalent circuit of each piezoelectric crystal.

For example, a piezoelectric crystal having a resonant frequency of 3.5 MHz generates maximum amplitude ultrasound waves if the drive pulses have a duration of approximately 140 nanoseconds.

Although the invention may be used as an ultrasound scanner, it is not limited to such devices. The invention may also be used for all ultrasound imaging devices in whcih several electro-acoustical elements are activated at a time. In addition the invention may be used for annular or phased arrays and is not limited to linear arrays.

We claim:

1. A method for generating an ultrasound beam having a desired intensity profile, comprising:
    generating drive pulses having durations and amplitudes;
    respectively coupling the drive pulses to individual crystals of a group of piezoelectric crystals so as to cause said piezoelectric crystals to emit ultrasound waves, and
    making the durations of at least some of the drive pulses different in order to vary the relative amplitudes of ultrasound waves generated by the piezoelectric crystals such that the desired intensity profile is obtained.

2. A method as in claim 1, wherein the durations of said drive pulses coupled to boundary crystals of the group of piezoelectric crystals are such that the ultrasound waves generated by the boundary crystals are of lesser amplitude than the waves generated by the other crystals.

3. A method as in claim 2, wherein at least some of said drive pulses that are coupled to individual crystals are delayed relative to other drive pulses.

4. An ultrasound imaging apparatus comprising:
    a plurality of individual piezoelectric crystals for emitting individual ultrasound waves for combination in an ultrasound beam;
    a pulse generator; and
    adjusting means for selectably adjusting the duration of pulses generated by the pulse generator and for applying the adjusted pulses to selected ones of the piezoelectric crystals such that the ultrasound beam has a desired intensity profile.

5. An apparatus as in claim 4, further comprising a delay means coupled between the pulse generator and the adjusting means, for selectably delaying pulses generated by the pulse generator.

6. An apparatus as in claim 5, wherein the adjusting means is digitally controllable.

7. A method for generating an ultrasound beam comprising:
    generating drive pulses having individual amplitudes and durations;
    respectively coupling said drive pulses to piezoelectric crystals of a group, the duration of the drive pulses coupled to some of said crystals being less then the duration of drive pulses coulped to other crystals of the group so that said crystals generate an ultrasound beam having a desired intensity profile.

8. A method as set forth in claim 7 wherein the crystals to which drive pulses of lesser duration are applied are at the ends of said group.

9. A method as set forth in claim 8 wherein:

the drive pulses are coupled to crystals of the group at different times so as to focus said ultrasound beam at a desired location.

10. Apparatus for generating an ultrasound beam comprising:
   means for producing drive pulses at least some of which have different durations,
   a plurality of piezoelectric crystals for emitting ultrasound waves that combine to form an ultrasound beam, and
   means for respectively coupling said drive pulses to said piezoelectric crystals so that said ultrasound beam has a desired intensity profile.

11. Apparatus as set forth in claim 10 further comprising:
   means coupled to one of said means for selectively delaying the drive pulses coupled to said crystals so as to focus said ultrasound beam at a desired location.

* * * * *